455-611 · AU 233 EX

FIP8106 XR 3,714,437

United States Patent [19]

Kinsel

[11] 3,714,437

[45] Jan. 30, 1973

[54] OPTICAL COMMUNICATION SYSTEM WITH PCM ENCODING WITH PLURAL DISCRETE UNEQUALLY SPACED INTENSITY LEVELS

[75] Inventor: Tracy Stewart Kinsel, Bridgewater Township, Somerset County, N.J.

[73] Assignee: Bell Telephone Laboratories, Incorporated, Murray Hill, N.J.

[22] Filed: Aug. 14, 1970

[21] Appl. No.: 63,708

[52] U.S. Cl. ................................250/199, 325/38 A

[51] Int. Cl. ..............................................H04b 9/00

[58] Field of Search .....250/199; 325/38, 38 A, 38 B, 325/39, 61; 179/15 A, 15 R

[56] References Cited

UNITED STATES PATENTS 3,363,103 1/1968 Fowler ................................250/199

3,532,890 10/1970 Denton................................250/199

3,518,662 6/1970 Nakagome et al.................325/38 A

OTHER PUBLICATIONS

Denton, The Laser and PCM, June 1968, Bell Labs Review pp. 175–179.

Kinsel, Terminal for PCM Communication System, Feb. 1968, IEEE pp. 140–153

*Primary Examiner*—Robert L. Griffin

*Assistant Examiner*—Donald E. Stout

*Attorney*—R. J. Guenther and Kenneth B. Hamilton

[57] ABSTRACT

In an optical communication system a multilevel pulse code modulation (PCM) format is imposed on the output of a laser. By making the spacings between intensity levels unequal, a significant improvement in performance is achieved relative to a system in which the intensity levels are equally spaced apart.

5 Claims, 6 Drawing Figures

INVENTOR
T. S. KINSEL
BY Lucian C. Canepa
ATTORNEY

OPTICAL COMMUNICATION SYSTEM WITH PCM ENCODING WITH PLURAL DISCRETE UNEQUALLY SPACED INTENSITY LEVELS

This invention relates to communication systems and, more particularly, to optical communication systems of the multilevel PCM type.

BACKGROUND OF THE INVENTION

It is known to employ a pulse code modulation (PCM) binary format as the basis for an optical communication system. Moreover it is known to increase the information rate of a PCM system by resorting to a multilevel or N-ary PCM format, where N is a positive integer greater than 2 and is the number of levels employed. In an N-ary optical system the intensity of each optical pulse is controlled, in accordance with the amplitude of an electrical information signal to be encoded, to assume any one of N equally spaced-apart levels. As the number of levels is increased, the information rate of the system is also increased.

But as the number of levels in a multilevel optical PCM system is increased, a point is reached at which overlapping occurs of the probability distributions of the detected intensities associated with different pulse levels. In turn, this overlapping of intensity distributions gives rise to errors in the detection process carried out in the receiver of the system. Accordingly, the specification of a maximum permissible error rate for the system limits in effect the number of intensity levels that may be used to represent information. As a consequence, a limit is thereby imposed on the maximum information rate capability of the system.

SUMMARY OF THE INVENTION

An object of the present invention is an improved optical communication system of the multilevel PCM type.

More specifically, an object of this invention is a multilevel optical PCM system having an enhanced information rate capability.

Briefly, these and other objects of the present invention are realized in a specific illustrative embodiment thereof which includes an optical source for supplying successive signals whose intensities are to be controlled in accordance with the sampled values of an analog signal to be encoded. In particular, the respective intensities of successive optical signals are controlled by an electro-optic intensity modulator to occur at selected ones of a plurality of unequally spaced-apart levels. In one illustrative embodiment the spacing of intensity levels is graded, with lower levels being positioned closer together than upper levels.

Accordingly, a principal feature of the present invention is that the respective intensities of a set of optical signals comprising a multilevel PCM pulse signal be controlled to occur at discrete levels that are unequally spaced apart.

BRIEF DESCRIPTION OF THE DRAWING

A complete understanding of the present invention and of the above and other objects, features and advantages thereof may be gained from a consideration of the following detailed description of a specific illustrative embodiment thereof presented hereinbelow in conjunction with the accompanying drawing, in which.

DETAILED DESCRIPTION

Figure 1:
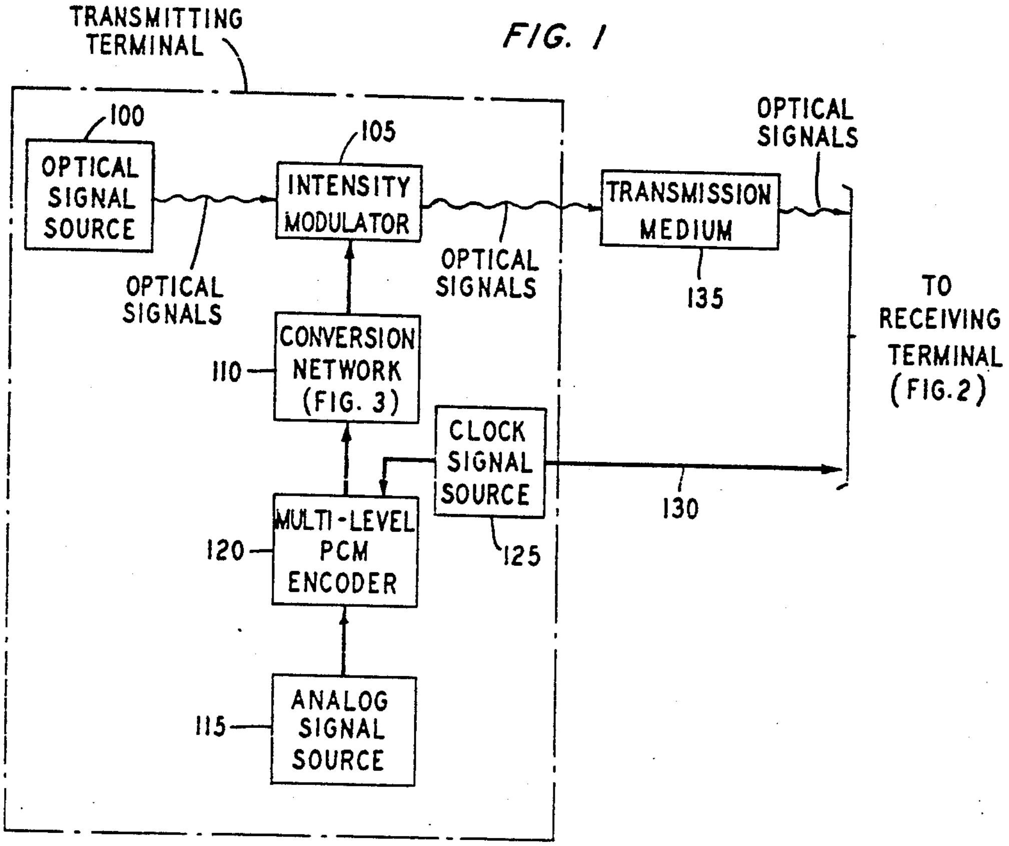
FIG. 1 shows the transmitting terminal of an optical communication system made in accordance with the principles of the present invention.
Figure 2:
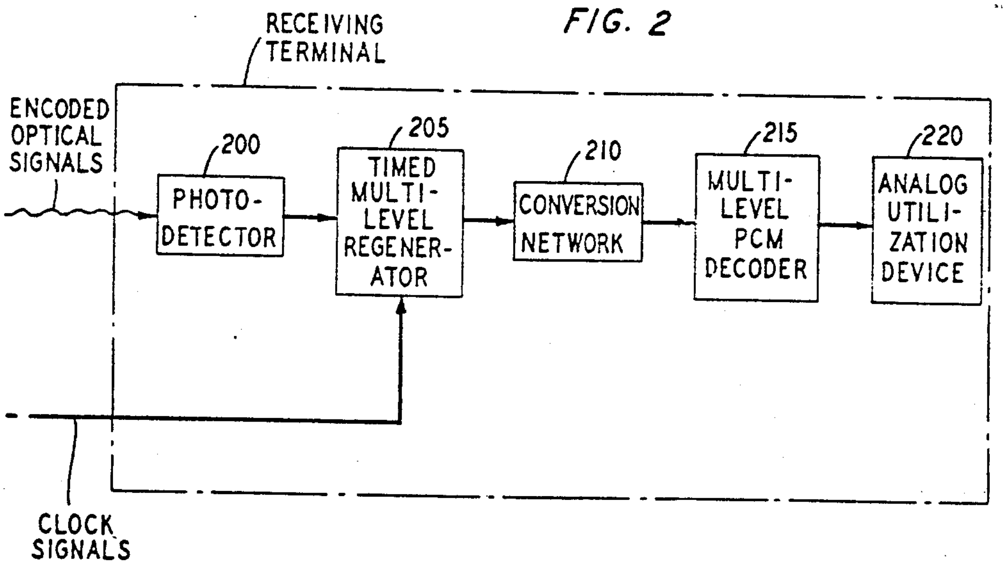
FIG. 2 depicts the receiving terminal of such a system.

The transmitting terminal shown in FIG. 1 includes a source 100 for providing optical signals that are to be modulated to represent an analog signal and then propagated to an associated receiving terminal (FIG. 2). Illustratively, the source 100 comprises a conventional mode-locked laser whose output consists of a regular sequence of constant-intensity optical pulses separated by a time $T = 2l/c$, with a pulse width between half-power points of approximately $1/f_1$, where $c$ is the velocity of light, $l$ is the mirror separation in the laser cavity, and $f_1$ is the frequency width of the laser transition. Alternatively, the source 100 may comprise a Q-switched laser, a cavity-dumped laser or even a laser operating in the continuous-wave mode. For exemplary purposes, however, the source 100 will be assumed herein to be a mode-locked laser providing a series of narrow spaced-apart equal-intensity pulses. A typical such mode-locked laser is described in "Stabilization and Modulation of Laser Oscillators by Internal Time-Varying Perturbation," by S. E. Harris, pp. 1401–1413, October 1966, *Proceedings of the IEEE*.

Each one of the pulses in the sequence of spaced-apart pulses generated by the optical signal source 100 of FIG. 1 is directed at a conventional electrically controlled intensity modulator 105. The modulator 105 is, for example, of the type described in "Terminals for a High-Speed Optical Pulse Code Modulation Communication System: I. 224–M bit/s Single Channel," by R. T. Denton and T. S. Kinsel, pp. 140–145, February 1968, *Proceedings of the IEEE*. Electrical control signals are applied to the modulator 105 from a conversion network 110 in synchronism with the propagation of optical pulses through the modulator. As a result, each optical pulse that exits from the modulator 105 is characterized by an intensity having a predetermined relationship with a corresponding electrical control signal. In accordance with the principles of the present invention, each optical pulse is controlled, as described in detail below, to have one of $b$ discrete unequally spaced-apart intensities. Each set of $n$ such optical pulses constitutes a pulse code group. The number of different discrete representations that can be expressed with a code group of this type is $b^n$.

The signal whose informational content is to be impressed on the optical pulse stream supplied by the source 100 of FIG. 1 is provided by an analog signal source 115. The electrical signal output of the source 115 is representative of a band-limited function that is continuous with time, such as, for example, a speech or video signal representation. A waveform 400, typical of such a representation, is depicted in FIG. 4(*a*).

Figure 4:
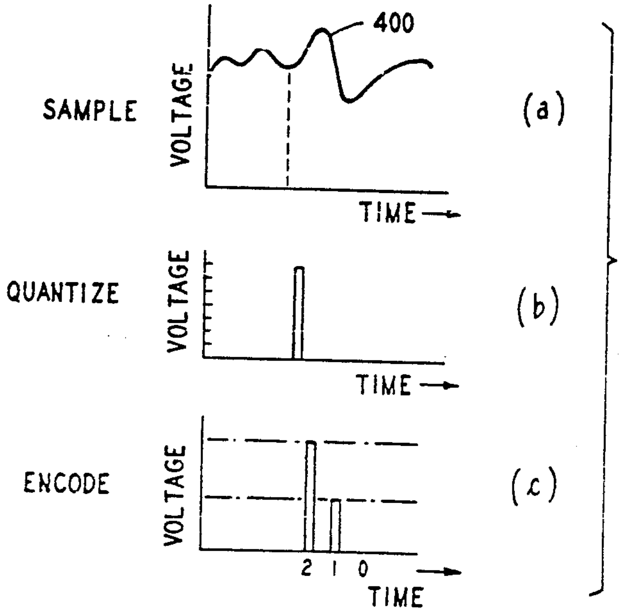

If a continuous signal of the type designated 400 in FIG. 4(*a*) is sampled at regular intervals and at a rate at least twice the highest signal frequency, then the samples contain all the information of the original signal. For illustrative purposes, one such sampling time is assumed to occur in FIG. 4(*a*) at the time indicated by a vertical dashed line. At that time a sample is obtained which is representative of the depicted analog signal. The sample is called a pulse-amplitude-modulated or PAM signal. Although discrete in time, it is advantageous not to use PAM pulses for digital transmission because they are not discrete in amplitude. It is therefore conventional in the art to select the nearest one of a plurality of discrete-amplitude pulses as representative of the PAM pulse. Representing a PAM signal by a discrete and therefore limited number of signal amplitudes is called quantizing. Thus, in FIG. 4(*b*) there is shown a vertical quantization scale having discrete values any one of which may be utilized to represent a PAM signal. The pulse shown in FIG. 4(*b*) is assumed to have the amplitude nearest the PAM signal indicated in FIG. 4(*a*). Thus, for example, if the PAM signal has a value of, say, 20.7 volts and the quantization scale has values spaced apart at 3-volt intervals, the quantizing sample would have a value of 21 volts.

In a conventional radio-frequency digital transmission system, a quantized sample can be sent as a single pulse having certain possible discrete amplitudes. However, if many discrete sample amplitudes are required (100, for example), the inevitable presence of noise prevents the receiver from accurately distinguishing among that many amplitudes. It is more feasible to design a circuit that can determine simply whether or not a pulse is present (binary notation) or which one of a relatively small number of discrete amplitudes is present (multilevel notation). Thus, typically, several pulses are employed as a code group to represent the amplitude of a single quantized sample. Hence, in a binary PCM system, with a code group consisting of five pulses, any one of 32 different discrete amplitudes can be represented. In this format the single quantized sample shown in FIG. 4(*b*) could be represented as 10101. Moreover, in a conventional multilevel code group each pulse is selected to have discrete amplitudes of 0, 1 and 2 units (ternary or base 3 notation) or 0, 1, 2 and 3 units (quaternary or base 4) etc.

Illustratively, the quantized sample shown in FIG. 4(*b*) is assumed to be encoded into a ternary code group having three pulses. For each pulse, the representative pulse amplitude is selected to have a value representative of 0, 1 or 2. In such a format, the particular code group shown in FIG. 4(*c*) is representative of the previously considered 21-volt quantized sample. In prior art systems, the plural possible discrete amplitudes of each pulse of a multidigit code group are equally spaced apart. Thus, in FIG. 4(*c*) the depicted voltage levels are shown as being equally spaced apart.

The above-described sampling, quantizing and encoding operations take place in a conventional multilevel PCM encoder 120 which, for example, is of the type described in H. B. Haard et al., U.S. Pat. No. 2,718,621 issued, Sept. 20, 1955, or F. D. Waldhauer U.S. Pat. No. 3,161,868, issued Dec. 15, 1964. As indicated above, a ternary PCM system is assumed herein for purposes of illustration. Accordingly, the code group of FIG. 4(*c*) is representative of the output of the encoder 120 for a 21-volt quantized sample.

The multilevel PCM encoder 120 shown in FIG. 1 operates in a synchronous manner under the control of timing signals applied thereto by a clock signal source 125. Signals from the clock source 125 are also furnished to the receiving terminal shown in FIG. 2. In the receiving terminal these signals are utilized to cause various operations to be performed therein in a predetermined timed relationship with respect to the operation of the transmitting terminal.

Illustratively, the clock signals provided by the source 125 are separately propagated to the receiving terminal via a forward transmission signal 130. Alternatively, by conventional synchronization-signal-recovery techniques, timing signals may be derived in the receiving terminal of FIG. 2 directly from the modulated optical signals propagated thereto. In this alternative case a separate timing channel is not required.

In accordance with the principles of the present invention, the amplitudes of the electrical control signals applied to the intensity modulator 105 of FIG. 1 are specified in a unique way. In particular, the amplitudes of the control signals are selected so that the respective intensities of optical signals exiting from the modulator 105 can exist only at discrete unequally spaced-apart levels. The manner in which this is accomplished will be explained with the aid of FIG. 5.

Figure 5:
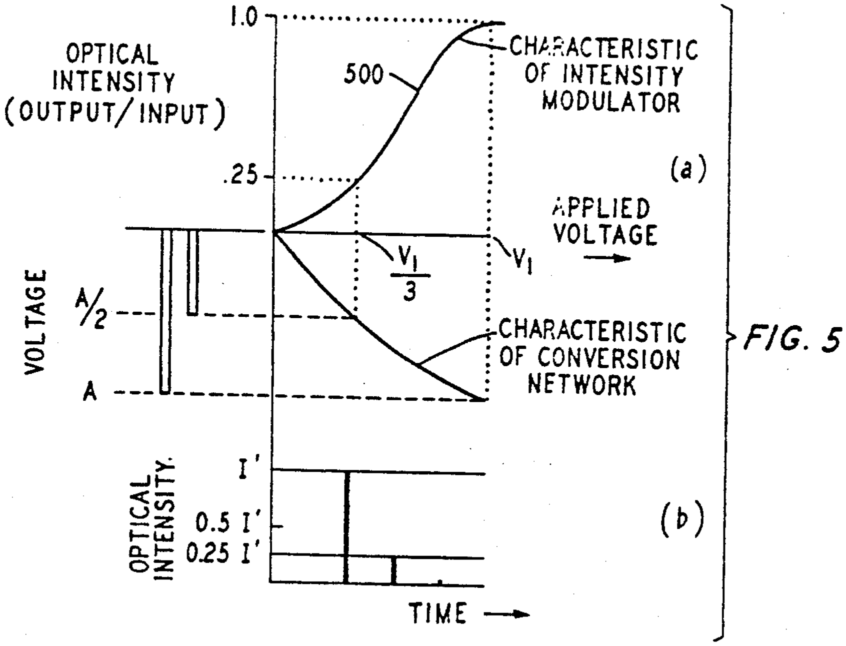

A typical transfer characteristic 500 of the intensity modulator 105 is shown in the first quadrant of FIG. 5(*a*). For any value of voltage applied to the modulator 105, the characteristic designates a corresponding value on the ordinate of FIG. 5(*a*) indicative of what portion of the intensity of an applied optical signal emerges from the modulator. Thus, for example, if the applied voltage has a value of $V_1$, the applied optical signal is passed undiminished through the modulator 105. On the other hand, if no voltage is applied to the modulator, no optical signal emerges therefrom. For any specified applied voltages between 0 and $V_1$, the curve 500 defines the transmission characteristic of the modulator and, hence, the corresponding fraction of the intensity of the incident pulse that exits therefrom.

In accordance with the principles of this invention, the set of intensity levels exhibited by optical signals propagated through the modulator 105 includes a discrete number of unequally spaced-apart levels. Specifically, in one particular illustrative embodiment, the intensity levels permitted by the controlled modulator 105 are graded in accordance with the relationship $$I_j=\left(\frac{j-1}{N-1}\right)^2$$

$j=1,2 \ldots, N$, where $I'$ is the intensity level of an optical pulse transmitted by the modulator when the voltage $V_1$ is applied, and $N$ is the number of different permitted levels for each pulse of a code group. $N$ equals three for the illustrative ternary case considered herein. From the above relationship it is apparent that for the ternary case $I_1$ equals 0; $I_2 = I'/4$; and $I_3 = I'$. By contrast, in a conventional ternary system of the optical type, the allowed intensity levels are 0, $I'/2$ and $I'$. In other words, in a conventional optical system the intensity levels are equally spaced apart, as they are also in a conventional radio-frequency system of the multilevel type.

Graded intensity levels are achieved in the modulator 105 by applying predetermined electrical control signals thereto. These control signals are derived from the output of the PCM encoder 120. The output of the encoder 120, which is represented in FIG. 4(*c*), is also indicated in the third quadrant of FIG. 5(*a*). As indicated in FIG. 5(*a*), the depicted code group includes three electrical pulses, one with an amplitude *A*, one with an amplitude *A*/2 and the third with an amplitude of 0.These pulses are applied to the network 110 wherein they are respectively converted to electrical pulses whose amplitudes are, for example, $V_1$, $V_1/3$ and 0. In turn, these levels, when applied to the modulator 105 during the respective times in which three successive optical signals are propagating therein, cause the optical signals emerging from the modulator to have intensities of $I'$, $0.25I'$ and 0. The resultant optical code group that emerges from the modulator 105 is represented in FIG. 5(*b*).

The pulses generated by a mode-locked laser are spaced relatively far apart. For example, the output pulses of a typical such laser each have a width of approximately 0.5 nanoseconds and the pulse period thereof is about 10 nanoseconds. Accordingly, the opportunity exists in an optical PCM system of the type described herein to time multiplex a plurality of optical code groups, each of which has the format shown in FIG. 5(*b*), thereby to increase significantly the information-handling capability of the system. To accomplish such multiplexing, the respective code group outputs of a plurality of transmitting terminals, each of the type shown in FIG. 1, are coupled to the transmission medium 135 in a conventional time-interleaved manner. (For a description of multiplexing and demultiplexing operations as applied to a conventional binary optical PCM system, see, for example, "Terminals for a High-Speed Optical Pulse Code Modulation Communication System: II. Optical Multiplexing and Demultiplexing," by T. S. Kinsel and R. T. Denton, pp. 146–154, February 1968, *Proceedings of the IEEE*.)

Before considering the underlying reason why unequally spaced-apart intensity levels are advantageous in an optical multilevel PCM system, an illustrative implementation for the conversion network 110 of FIG. 1 will be described. In addition, the receiving terminal of FIG. 2 will be described before considering the reason for utilizing unequally spaced-apart levels.

Figure 3:
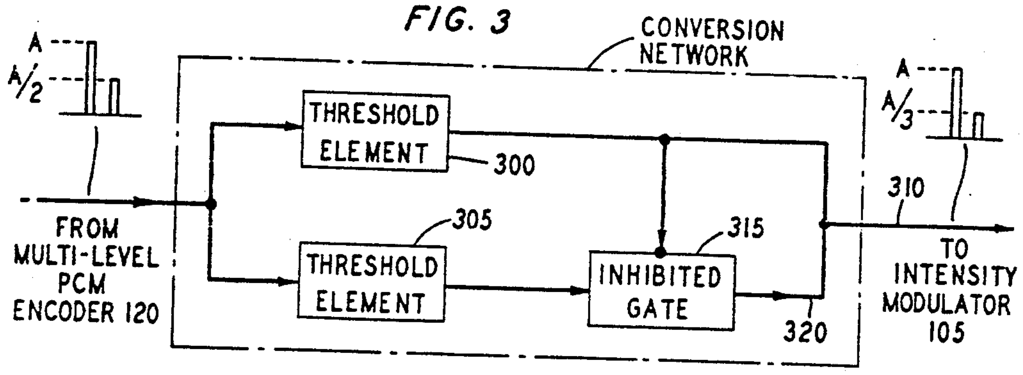
FIG. 3 illustrates one particular form of conversion network suitable for inclusion in the system of FIGS. 1 and 2.

An illustrative circuit arrangement for carrying out the above-described level-shifting function is shown in FIG. 3. Each of the successive pulses definitive of a code group is applied from the encoder 120 to the arrangement shown in FIG. 3. For an *n*-pulse code group, the arrangement includes *n*-1 threshold elements. Herein, *n* is assumed to equal 3. Hence, two threshold elements 300 and 305 are shown. Each of these elements comprises, for example, a conventional Schmitt trigger circuit having an adjustable threshold or triggering level and an adjustable output level. Thus, for instance, the element 300 is set to be activated by any input pulse whose amplitude is equal to or greater than a level which is slightly less than the amplitude *A*. In response to such an input pulse the element 300 provides an output pulse having an amplitude *A*. On the other hand, the element 305 is adjusted to respond to an input pulse having an amplitude equal to or greater than a level which is slightly less than *A*/2 to provide an output pulse having a level less than *A*/2, for example *A*/3.

As indicated, activation of the threshold element 300 causes it to generate a pulse of amplitude *A*. This output pulse is applied to output line 310 which extends to the intensity modulator 105. In addition, the output pulse of the element 300 is applied to the inhibit terminal of a conventional inhibited gate 315 to prevent any output from appearing on output lead 320 thereof. Accordingly, the element 305, which is also activated by any pulse that triggers the element 300, has its output blocked from appearing on the output line 310 during the time in which the element 300 applies its output thereto.

Activation of the threshold element 305 by a pulse having an amplitude of *A*/2 (or slightly less) does not trigger the element 300. Hence, in that case the gate 315 is not inhibited. As a result, the output of the element 305 is delivered via the gate 315 to the output line 310. In response to each triggering pulse, the element 305 provides, illustratively, an output pulse having an amplitude *A*/3. Accordingly, an electrical pulse amplitude conversion operation is thereby achieved. Of course, a 0-amplitude signal applied to the elements 300 and 305 will cause neither element to be activated, whereby a 0-amplitude signal will appear on the output line 310 in the corresponding pulse position.

The particular network shown in FIG. 3 is illustrative only. A variety of other level-shifting techniques are known in the art for performing the specific conversion function attributed to the FIG. 3 arrangement.

The modulated optical signals emerging from the intensity modulator 105 of FIG. 1 are applied to a suitable medium 135 for transmission to a receiving terminal (FIG. 2). The receiving terminal shown in FIG. 2 may be positioned at a spaced-apart location remote from the transmitting terminal or, on the other hand, may be located in close proximity to the transmitter to form therewith components of an optical signal processing system positioned at a single location. The medium 135 may, for example, comprise free space, optical fibers or an optical waveguide.

The illustrative receiving terminal depicted in FIG. 2 comprises a conventional photodetector 200 at which the encoded optical signals are directed. (Suitable photodetector units for inclusion in the FIG. 2 terminal are described in "High-Speed Photodetectors," by L. K. Anderson and B. J. McMurtry, pp. 1335–1349, October 1966, *Proceedings of the IEEE*.) The unit 200, which performs detection in a so-called direct way, may include an optical bandpass filter which serves to reject background radiation. Filtered optical signals which impinge on the photodetector 200 produce an output current proportional to the instantaneous intensity of the optical carrier. The unit 200 may be regarded as a linear intensity-to-current converter. Advantageously, an electrical low-pass filter which has a bandwidth sufficient to pass the information signal but which limits the amount of photodetector noise may also be included in the unit 200.

The electrical output of the photodetector 200 of FIG. 2 is applied to a conventional timed multilevel regenerator 205. In the regenerator 205, a series of decisions are made as to the amplitudes of the respective signals provided by the photodetector 200. (See the aforementioned citations for a PCM encoder for a description of a typical such regenerator.) The output of the unit 205 comprises a sequence of retimed and reshaped discrete-amplitude electrical pulses which are replicas of the intensity-modulated optical pulses received by the terminal of FIG. 2. Accordingly, the set of possible amplitudes of these pulses comprises a plurality of unequally spaced-apart levels. Illustratively, these pulses are applied to a conversion network 210 which, for example, is of the type shown in FIG. 3. The network 210 converts the pulses applied thereto to pulses whose amplitudes lie at equally spaced-apart values. As a result, the output of the network 210 can be applied directly to a conventional multilevel PCM decoder 215 such as is described, for example, in "-Broadband Codecs for an Experimental 224Mb/s PCM Terminal," J. O. Edson and H. H. Henning, pp. 1887–1940, November 1965, *The Bell System Technical Journal*. In turn, the analog output of the decoder 215 is applied to a utilization device 220 which, for example, comprises a telephone set, a television receiver or any other type of device that responds to analog signals.

Figure 6:
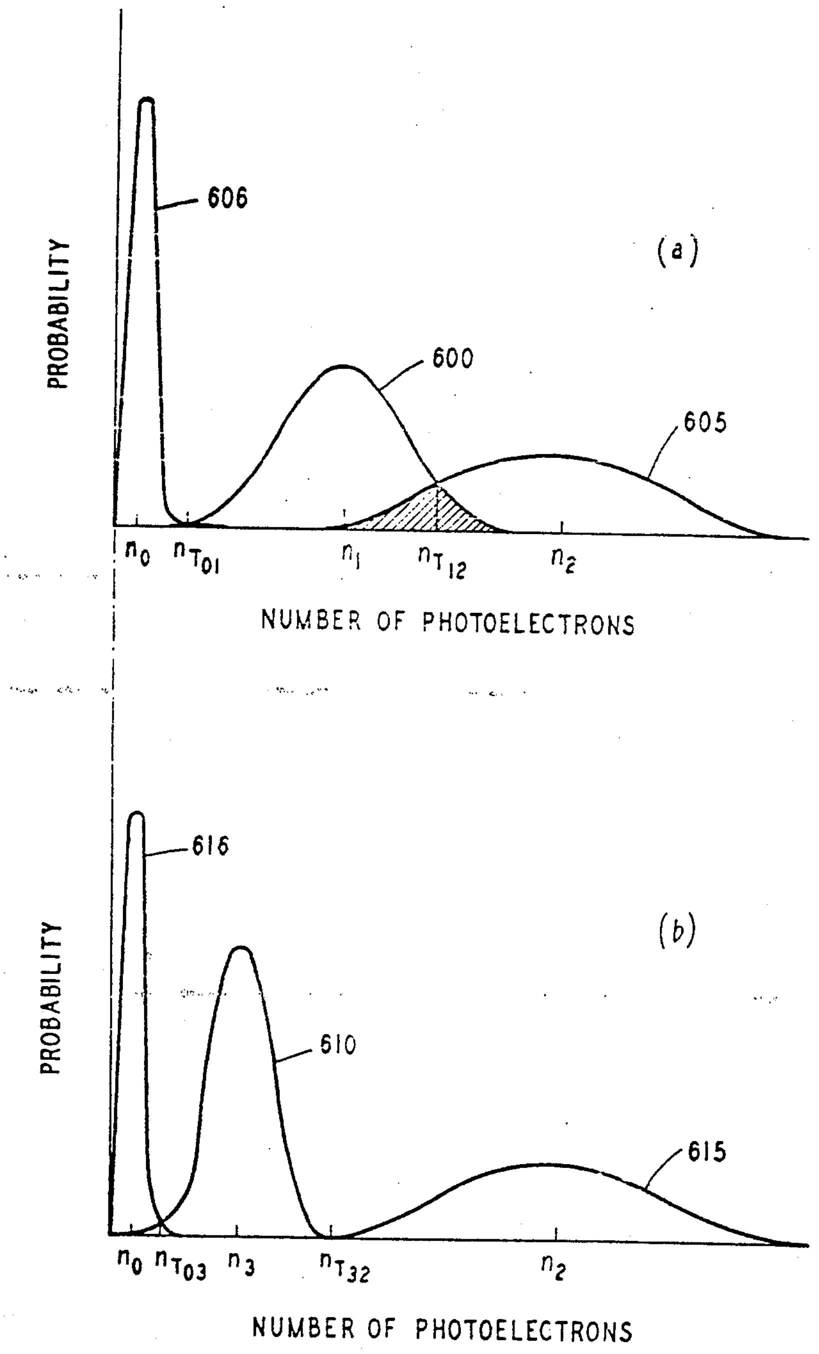
FIGS. 4 through 6 show various waveforms that are helpful in understanding the mode of operation of the depicted system.

The basis for the improvement in performance brought about by utilizing graded multilevel spacing can be understood by considering FIG. 6. FIG. 6(*a*) shows the probability densities of the number of received photoelectrons, for a conventional optical ternary PCM system. These probability densities are governed by Poisson statistics such as discussed, for example, in "Photoelectron Statistics Produced by a Laser Operating below and above the Threshold of Oscillation," by C. Freed and H. Hans, pp. 190–195, August 1966, *IEEE Journal of Quantum Electronics*. In this conventional system, the intensity levels of the transmitted optical pulses are equally spaced apart. In this representation, $n_1$ and $n_2$ can be considered to correspond respectively to the intensity levels $0.5I'$ and $I'$ shown in FIG. 5(*b*). Due to the fact that the output of the photo-detector 200 (FIG. 2) is the sum of the signal current the detector current due to background radiation and the detector dark current, the actual measured output of the detector in response to successive transmitted pulses each of intensity $0.5I'$ exhibits a probability distribution represented by curve 600 in FIG. 6(*a*). Similarly, the actual output of the detector 200 in response to successive transmitted pulses each of intensity $I'$ is represented by curve 605 in FIG. 6(*a*). Furthermore, the actual output of the detector 200 in response to successive transmitted pulses of 0 intensity is represented by curve 606 in FIG. 6(*a*). This last curve is entirely due to the aforementioned background radiation and detector dark current. The probability distributions 600 and 605 define an overlapping region (shaded area). Accordingly, if in the receiving terminal a threshold level $n_{T_{12}}$ is established as definitive of the *maximum* value of an $n_1$ pulse and the minimum value of an $n_2$ pulse, a region of uncertainty will exist in making a decision as to whether a received pulse corresponds to an $n_1$-intensity intensity pulse of an $n_2$-intensity pulse. This region therefore represents an error area in making threshold decisions. In other words, some $n_1$ pulses will be erroneously identified as $n_2$-level signals and some $n_2$ pulses will be incorrectly designated as $n_1$-level signals. Likewise the probability distributions 606 and 600 define an overlapping region of error with a corresponding threshold $n_{T_{01}}$.

An optical communication system made in accordance with the principles of the present invention is based on the recognition that the direct detection process employed in the system is governed by Poisson statistics. For a Poisson distribution the spread of the probability density increases as the average value (or PCM level) increases. Recognizing this, it is possible in accordance with the principles of this invention to space the allowed intensity levels so that the respective photoelectron probability distributions thereof contain a negligibly small overlapping area. In that way the region of decision uncertainty is decreased and, as a result, the error rate of the system is reduced.

FIG. 6(*b*) illustrates the result achieved in accordance with this invention by grading the selected intensity levels in a ternary PCM optical system. In FIG. 6(*b*) $n_2$ and $n_3$ correspond respectively to the intensity levels $I'$ and $0.25I'$ represented in FIG. 5(*b*). In this particular example, the probability distributions 610 and 615 contain a much reduced overlapping region. Hence, with respect to the threshold level $n_{T_{22}}$ shown in FIG. 6(*b*), any photoelectron count less than $n_{T_{32}}$ (and greater than $n_{T_{03}}$) will be unequivocally detected by the regenerator 205 (FIG. 2) to be representative of an $n_3$-level level pulse. Similarly, any detected photoelectron count greater than $n_{T_{32}}$ will, with a high degree of certainty, be designated as being representative of a received $n_2$-level pulse.

It is to be noted that reducing the value of the middle level from $n_1$ to $n_3$ increases the overlap area of the distributions 616 and 610. However, the overall error probability, which is the sum of all the overlap regions, is reduced by the use of graded spacings.

Thus, it is evident from FIG. 6 that by converting from an equal-spacing format to a graded-spacing ternary representation in accordance with the principles of this invention, one can for a given information rate thereby achieve a lower error probability. Alternatively, for a given maximum error rate, one can, employing the graded-spacing technique, divide a given optical signal into more levels than if equally spaced-apart levels are selected. In this latter case a higher information rate can be thereby realized.

For a given background noise level and dark current in an N-ary system of the type described herein, a degradation in performance may be observed as the number of graded levels is increased beyond a predetermined number. This is due to the fact that the more-closely-spaced-together lower levels in such a system are not easily resolved in the presence of relatively high levels of background noise. As the background noise level decreases, the improvement in using a graded spacing allows the sue of larger values of N. In any case the optimum graded spacing is determined by considering the particular character of the background noise in the system. It is to be understood that the above-described arrangements are only illustrative of the application of the principles of the present invention. In accordance with these principles, numerous other arrangements may be devised by those skilled in the art without departing from the spirit and scope of the invention.

What is claimed is:

1. In combination, an intensity modulator, means for directing successive equal-intensity unmodulated optical signals at said modulator for propagation therethrough, and means for selectively controlling the transmission characteristic of said modulator so that the intensity level of each optical signal emerging therefrom assumes one of a set of levels consisting only of plural discrete unequally spaced-apart intensity levels.

2. In combination in an optical communication system, means for generating successive equal-intensity unmodulated optical signals in the respective plural signal positions of a code group that is to be representative of an analog signal, and means responsive to said analog signal and interposed in the path of said optical signals for controlling the intensity of each optical signal in said code group to assume one of a set of levels consisting only of a plurality of discrete unequally spaced-apart intensity levels.

3. A combination as in claim 2 wherein said means for controlling comprises an analog signal source, a multilevel PCM encoder responsive to the output of said source for sampling said analog signal, quantizing said sampled signal and encoding said quantized signal into a multilevel pulse code group each of whose pulses is controlled to assume one of a plurality of equally spaced-apart levels, an electro-optic intensity modulator positioned in the path of said optical signals, and means responsive to the pulse code group output of said encoder for shifting the level of each constituent pulse thereof to one of a plurality of electrical levels which, when applied to said modulator, causes the optical signals emerging from said modulator to assume one of a plurality of unequally spaced-apart intensity levels.

4. A combination as in claim 3 further including a receiving terminal and a transmission medium for propagating optical signals emerging from said intensity modulator to said receiving terminal, said receiving terminal comprising a photodetector responsive to each optical signal of a code group propagated along said medium for providing an electrical signal representative thereof, a multilevel regenerator responsive to each electrical signal from said photodetector for providing a regenerated electrical signal having an amplitude selected from one of a plurality of discrete unequally spaced-apart levels, means responsive to each electrical signal from said regenerator for shifting the level thereof to one of a plurality of equally spaced-apart electrical levels, and means, responsive to each set of electrical signals representative of a code group from said means for shifting, for decoding said code group and formulating an analog signal therefrom.

5. In combination, a source for providing a set of successive equal-intensity unmodulated optical signals constituting a code group, and means for controlling the intensity of each signal in said code group in accordance with the respective nature of plural electrical information signals representative of an analog signal, said means for controlling comprising a multilevel PCM encoder responsive to said analog signal for providing an electrical pulse code group each of whose electrical pulses has an amplitude corresponding to one of a plurality of equally spaced-apart amplitude levels, said means for controlling further comprising means, including an intensity modulator positioned in the path of said optical signals, responsive to said electrical pulse code group for causing the intensity of each optical signal in said optical code group to have an intensity corresponding to one of a plurality of unequally spaced-apart intensity levels.

* * * * *